United States Patent
Meyer et al.

(10) Patent No.: US 10,769,179 B2
(45) Date of Patent: Sep. 8, 2020

(54) NODE LINKAGE IN ENTITY GRAPHS

(71) Applicant: AMERICAN EXPRESS TRAVEL RELATED SERVICES COMPANY, INC., New York, NY (US)

(72) Inventors: Matthew K. Meyer, Livingston, NJ (US); Rajesh Shah, Parsippany, NJ (US); Yashwanth Tekena, Harrison, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 267 days.

(21) Appl. No.: 15/941,892

(22) Filed: Mar. 30, 2018

(65) Prior Publication Data

US 2019/0303494 A1    Oct. 3, 2019

(51) Int. Cl.
*G06F 16/28* (2019.01)
*G06F 16/182* (2019.01)
*G06F 16/901* (2019.01)
*G06F 16/90* (2019.01)

(52) U.S. Cl.
CPC .......... *G06F 16/288* (2019.01); *G06F 16/182* (2019.01); *G06F 16/9024* (2019.01)

(58) Field of Classification Search
CPC .................................................... G06F 9/5011
USPC ................................................ 707/797, 798
See application file for complete search history.

(56) References Cited

U.S. PATENT DOCUMENTS

| | | |
|---|---|---|
| 8,145,679 B1 | 3/2012 | Baluja et al. |
| 8,386,377 B1 | 2/2013 | Xiong |
| 9,721,039 B2 | 8/2017 | Bier |
| 9,773,247 B1 | 9/2017 | Keld |
| 2009/0248434 A1 | 10/2009 | Pfeffer et al. |
| 2011/0142217 A1 | 6/2011 | Goldfarb |
| 2011/0252032 A1 | 10/2011 | Fitzgerald et al. |
| 2011/0270853 A1 | 11/2011 | Curbera |
| 2012/0072475 A1 | 3/2012 | Morrison |
| 2012/0130724 A1 | 5/2012 | Flegel et al. |
| 2012/0324027 A1 | 12/2012 | Vaynblat et al. |
| 2013/0124357 A1 | 5/2013 | He et al. |
| 2014/0122595 A1 | 5/2014 | Murdoch et al. |
| 2014/0282219 A1* | 9/2014 | Haddock ................. G06F 16/22 715/781 |
| 2017/0243127 A1* | 8/2017 | Zhu ........................ G06N 5/003 |
| 2018/0082183 A1* | 3/2018 | Hertz ..................... G06Q 10/10 |
| 2019/0354544 A1* | 11/2019 | Hertz .................... G06F 16/338 |

OTHER PUBLICATIONS

Matthew K. Meyer, U.S. Appl. No. 15/972,407, filed May 7, 2018 and entitled "Network Effect Classification".
Sandeep Bose, U.S. Appl. No. 15/991,210, filed May 29, 2018 title Network Node Consolidation.

(Continued)

*Primary Examiner* — Baoquoc N To
(74) *Attorney, Agent, or Firm* — Thomas | Horstemeyer, LLP (57) ABSTRACT

A distributed file system may store a plurality of entity attributes. A node linking system may identify similarities between entity attributes for different entities. The node linking system may generate an entity graph which displays relationships and similarities between entities in a graphical user interface.

20 Claims, 5 Drawing Sheets

(56) References Cited

OTHER PUBLICATIONS

Non-Final Office Action dated Feb. 27, 2014 in U.S. Appl. No. 13/675,651.
Final Office Action dated Jun. 13, 2014 in U.S. Appl. No. 13/675,651.
Advisory Action dated Jul. 31, 2014 in U.S. Appl. No. 13/675,651.
Non-Final Office Action dated Sep. 2, 2014 in U.S. Appl. No. 13/675,651.
Final Office Action dated Jan. 29, 2015 n U.S. Appl. No. 13/675,651.
Advisory Action dated Mar. 4, 2015 in U.S. Appl. No. 13/675,651.
Non-Final Office Action dated Aug. 25, 2016 in U.S. Appl. No. 14/750,017.
Non-Final Office Action dated May 11, 2018 in U.S. Appl. No. 15/494,792.
Final Office Action dated Oct. 12, 2018 in U.S. Appl. No. 15/494,792.
Advisory Action dated Jan. 2, 2019 in U.S. Appl. No. 15/494,792.
Non-Final Office Action dated Feb. 20, 2019 in U.S. Appl. No. 15/494,792.
Final Office Action dated Aug. 16, 2019 in U.S. Appl. No. 15/494,792.

\* cited by examiner

NODE LINKAGE IN ENTITY GRAPHS

FIELD

This disclosure generally relates to computer systems, and more particularly, to linking nodes in a network.

BACKGROUND

A network may comprise thousands or millions of nodes. Each node may represent an entity in the network. Viewed in isolation, each node may appear to represent a unique entity. However, in many cases, one person may be responsible for a node representing an individual, and the same person may be responsible for a node representing a corporation. Additionally, one person may be responsible for a node representing that person in a first country, and the same person may be responsible for a node representing that person in a different country. Furthermore, many relationships may exist between nodes, which may be difficult or impossible to understand when looking at nodes individually. Maintaining the network without understanding the relationships between nodes may require larger amounts of processing power and limit the effectiveness of the network. Additionally, it is difficult to present node relationships in a useful manner using current systems.

SUMMARY

Systems, methods, and articles of manufacture (collectively, the "system") for providing dynamic customized user interfaces are disclosed. The system may perform operations including storing first entity attributes for a first entity in a distributed file system; storing second entity attributes for a second entity in the distributed file system; receiving, from a computing device, a selection of the first entity; calculating a similarity between the first entity attributes for the first entity and the second entity attributes for the second entity; generating an entity graph for the first entity, wherein the entity graph is displayed in a graphical user interface on the computing device, wherein the entity graph displays a first node representing the first entity, a second node representing the second entity, and an edge connecting the first node and the second node, wherein the edge represents the similarity between the first entity attributes and the second entity attributes.

In various embodiments, the operations may include receiving a selection of the edge; and transmitting a description of the similarity to the computing device, wherein the computing device displays the similarity. The operations may include receiving, from the computing device, a selection of the second entity; and generating an entity graph for the second entity, wherein the computing device displays the entity graph for the second entity in the graphical user interface. The operations may comprise identifying a relationship between the first entity and the second entity, wherein the relationship comprises a customer to customer relationship, a business to business relationship, or a business to customer relationship. The operations may comprise calculating a confidence level of the relationship. A feature of the edge may be displayed based on the confidence level of the relationship. The similarity may comprise a straight match and a behavioral match.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods for linking nodes in a computer network and displaying the relationships between linked nodes are displayed herein. Each node in the computer network may represent an entity, such as an individual or a business. The nodes may be linked using a combination of straight matches and behavioral matches. The straight matches may compare data values such as name, address, phone, email, cookies, IP address, social security number, driver license, GUID, ICLIC_ID, DUNS, tax identification number, etc. The behavioral match may compare attributes such as offer similarity, channel similarity, content similarity, and transaction similarity.

The system may display the nodes in various entity graphs. Edges between the nodes may represent a relationship between the nodes. The thickness, or other feature, of the different edges may correspond to the strength of the relationship. For example, an edge between nodes may represent a customer to customer relationship, a business to business relationship, a business to customer relationship, a cross-border relationship, or a behavioral relationship.

This process improves the functioning of the computer. For example, by displaying entity relationships in the described format, the user performs less computer functions and provides less input, because the user is able to quickly find the desired content, which saves on data storage and memory which speeds processing. With the use of this method, the user may be able to quickly and efficiently accomplish their intended task and reduce the computational time, overhead, and resource usage (e.g. memory, cpu, battery) on the user device.

Network data may be stored in two NoSQL (HBase) tables. A first table may store nodes, and a second table may store the edges. The network data may be accessed using NetworkID as partial HBase RowKey. The keys in HBase may be lexicographically sorted. Thus, all keys belonging to a single NetworkID may fall in the same HBase Region server, which may eliminate multiple disk scans and result in faster response times.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record.

Figure 1:
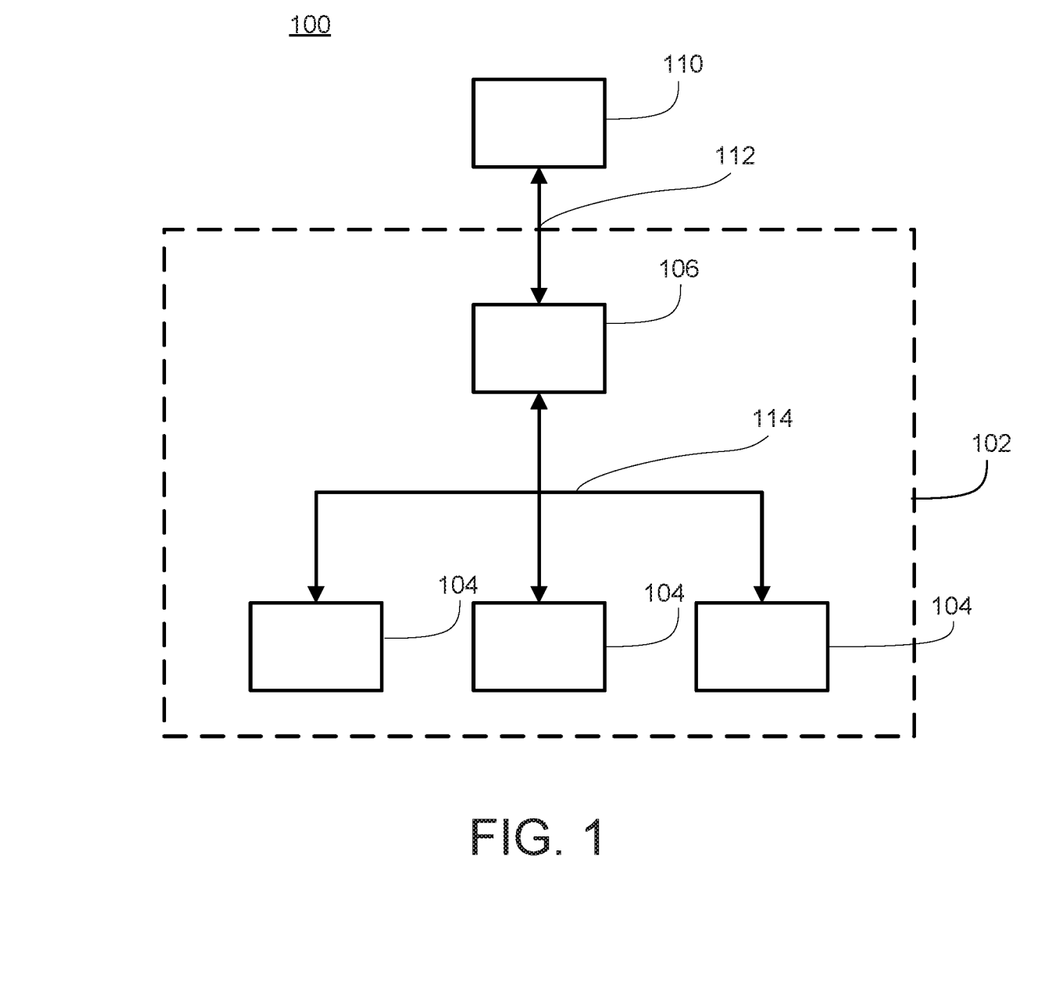
FIG. 1 is a block diagram illustrating various components of a distributed file system for generating entity graphs, in accordance with various embodiments.

Referring to FIG. 1, a distributed file system (DFS) 100 for generating entity graphs is illustrated in accordance with various embodiments. DFS 100 comprises a distributed computing cluster 102 configured for parallel processing and storage. Distributed computing cluster 102 may comprise a plurality of nodes 104 in electronic communication with each of the other nodes, as well as a control node 106. Processing tasks may be split among the nodes of distributed computing cluster 102 to improve throughput and enhance storage capacity. Distributed computing cluster may be, for example, a Hadoop® cluster configured to process and store big data sets with some of nodes 104 comprising a distributed storage system and some of nodes 104 comprising a distributed processing system. In that regard, distributed computing cluster 102 may be configured to support a Hadoop® distributed file system (HDFS) as specified by the Apache Software Foundation at http://hadoop.apache.org/docs/.

In various embodiments, nodes 104, control node 106, and client 110 may comprise any devices capable of receiving and/or processing an electronic message via network 112 and/or network 114. For example, nodes 104 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or, network 114 may comprise an external connection to enable direct electronic communication with client 110 and the internet.

In various embodiments, DFS 100 may process hundreds of thousands of records from a single data source. DFS 100 may also ingest data from hundreds of data sources. The data may be processed through data transformations to generate output variables from input variables. In that regard, input variables may be mapped to output variables by applying data transformations to the input variables and intermediate variables generated from the input values. Nodes 104 may process the data in parallel to expedite the processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104 for batch processing. Each node 104 may then process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 2:
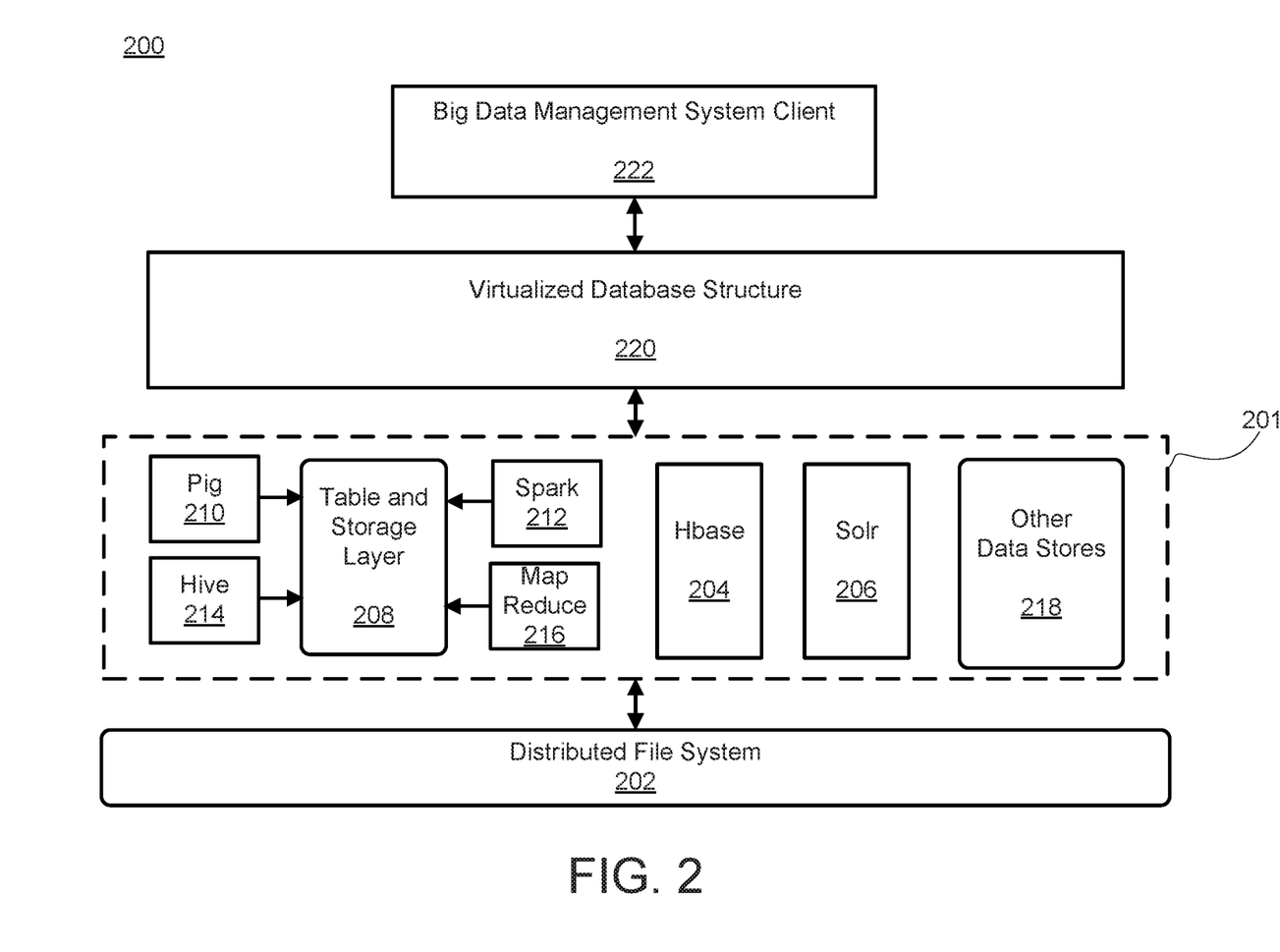
FIG. 2 illustrates a big data management system (BDMS) for generating entity graphs, in accordance with various embodiments.

With reference to FIG. 2, an exemplary architecture of a big data management system (BDMS) 200 for generating entity graphs is illustrated in accordance with various embodiments. BDMS 200 may be similar to or identical to DFS 100 of FIG. 1, for example. DFS 202 may serve as the physical storage medium for the various data storage formats 201 of DFS 202. A non-relational database 204 may be maintained on DFS 202. For example, non-relational database 204 may comprise an HBase™ storage format that provides random, real time read and/or write access to data, as described and made available by the Apache Software Foundation at http://hbase.apache.org/.

In various embodiments, a search platform 206 may be maintained on DFS 202. Search platform 206 may provide distributed indexing and load balancing to support fast and reliable search results. For example, search platform 206 may comprise a Solr® search platform as described and made available by the Apache Software Foundation at http://lucene.apache.org/solr/.

In various embodiments, a data warehouse 214 such as Hive® may be maintained on DFS 202. The data warehouse 214 may support data summarization, query, and analysis of warehoused data. For example, data warehouse 214 may be a Hive® data warehouse built on Hadoop® infrastructure. A data analysis framework 210 may also be built on DFS 202 to provide data analysis tools on the distributed system. Data analysis framework 210 may include an analysis runtime environment and an interface syntax such similar to those offered in the Pig platform as described and made available by the Apache Software Foundation at https://pig.apache.org/.

In various embodiments, a cluster computing engine 212 for high-speed, large-scale data processing may also be built on DFS 202. For example, cluster computing engine 212 may comprise an Apache Spark™ computing framework running on DFS 202. The Apache Spark™ computing framework may take in customer offer interactions on different channels and transaction data in various industries as input, and the Apache Spark™ computing framework may use approximate nearest neighbors algorithms, such as locality-sensitive hashing (LSH), with Euclidean distance measures to accurately compute similarities between entities.

DFS 202 may further support a MapReduce layer 216 for processing big data sets in a parallel, distributed manner to produce records for data storage formats 201. For example, MapReduce layer 216 may be a Hadoop® MapReduce framework distributed with the Hadoop® HDFS as specified by the Apache Software Foundation at http://hadoop.apache.org/docs/. The cluster computing engine 212 and MapReduce layer 216 may ingest data for processing, transformation, and storage in data storage formats 201 using the distributed processing and storage capabilities of DFS 202.

In various embodiments, the MapReduce layer 216 may take in entity attributes as inputs. The MapReduce layer 216 may generate confidence based linkages, also referred to as edges.

In various embodiments, DFS 202 may also support a table and storage management layer 208. Table and storage management layer 208 may provide an interface for reading and writing data for multiple related storage formats. The table and storage management layer 208 may provide an interface for one or more of the interrelated technologies described above such as, for example, Hive®, Pig, Spark®, and Hadoop® MapReduce.

In various embodiments, DFS 202 may also include various other data storage formats 218. Other data storage formats 218 may have various interface languages with varying syntax to read and/or write data. In fact, each of the above disclosed storage formats may vary in query syntax and interface techniques. Virtualized database structure 220 may provide a uniform, integrated user experience by offering users a single interface point for the various different data storage formats 201 maintained on DFS 202. Virtualized database structure 220 may be a software and/or hardware layer that makes the underlying data storage formats 201 transparent to client 222 by providing variables on request. Client 222 may request and access data by requesting variables from virtualized database structure 220. Virtualized database structure 220 may then access the variables using the various interfaces of the various data storage formats 201 and return the variables to client 222.

In various embodiments, the data stored using various of the above disclosed data storage formats 201 may be stored across data storage formats 201 and accessed at a single point through virtualized database structure 220. The variables accessible through virtualized database structure 220 may be similar to a column in a table of a traditional RDBMS. That is, the variables identify data fields available in the various data storage formats 201.

In various embodiments, variables may be stored in a single one of the data storage formats 201 or replicated across numerous data storage formats 201 to support different access characteristics. Virtualized database structure 220 may comprise a catalog of the various variables available in the various data storage formats 201. The catalogued variables enable BDMS 200 to identify and locate variables stored across different data storage formats 201 on DFS 202. Variables may be stored in at least one storage format on DFS 202 and may be replicated to multiple storage formats on DFS 202. The catalog of virtualized database structure 220 may thus track the location of a variable available in multiple storage formats.

In various embodiments, virtualized database structure 220 may provide a single, unified, and virtualized data storage format that catalogues accessible variables and provides a single access point for records stored on data storage formats 201. Client 222 (which may operate using similar hardware and software to client 110 of FIG. 1) may access data stored in various data storage formats 201 via the virtualized database structure 220. In that regard, virtualized database structure 220 may be a single access point for data stored across the various data storage formats 201 on DFS 202.

In various embodiments, virtualized database structure 220 may store and maintain the catalog of variables including locations and descriptive metadata, but virtualized database structure 220 may not store the actual data contained in each variable. The data that fills the variables may be stored on DFS 202 using data storage formats 201. Virtualized database structure 220 may enable read and write access to the data stored in data storage formats 201 without a client system having knowledge of the underlying data storage formats 201.

The BDMS 200 may store entity attributes of the DFS 202. The entity attributes may comprise identification attributes. The identification attributes may comprise data which identify or describe an entity. For example, identification attributes may include name, business name, address, phone number, email address, internet cookies, IP address, social security number, driver license number, GUID, ICLIC_ID, DUNS, tax identification number, vehicle identification number, vehicle license plate number, employer name, employer address, birth date, place of birth, etc.

The entity attributes may comprise behavioral attributes. The behavioral attributes may comprise activities in which an entity has engaged, including actions that an entity has taken in response to a triggering event. For example, a behavioral attribute may indicate that an entity never responds to an offer of a 10% discount, but that the entity accepts offers of 50% discounts 10% of the time.

The behavioral attributes may include channels in which an entity conducts actions. For example, the behavioral attributes may indicate that an entity conducts 80% of their transactions using a digital wallet on a mobile phone. Channels may include digital wallets, phone purchases, internet purchases, peer-to-peer payments, in-person payments, smart TV transactions, video game console transactions, cash transactions, etc.

The behavioral attributes may include types of content consumed by the entity. For example, the content may include types of items or services purchased, types of television or movies watched, websites visited, places traveled to, etc.

The behavioral attributes may include transaction details. For example, the behavioral attributes may include transaction amounts, times, locations, items purchased, merchant identifications, etc.

Figure 3:
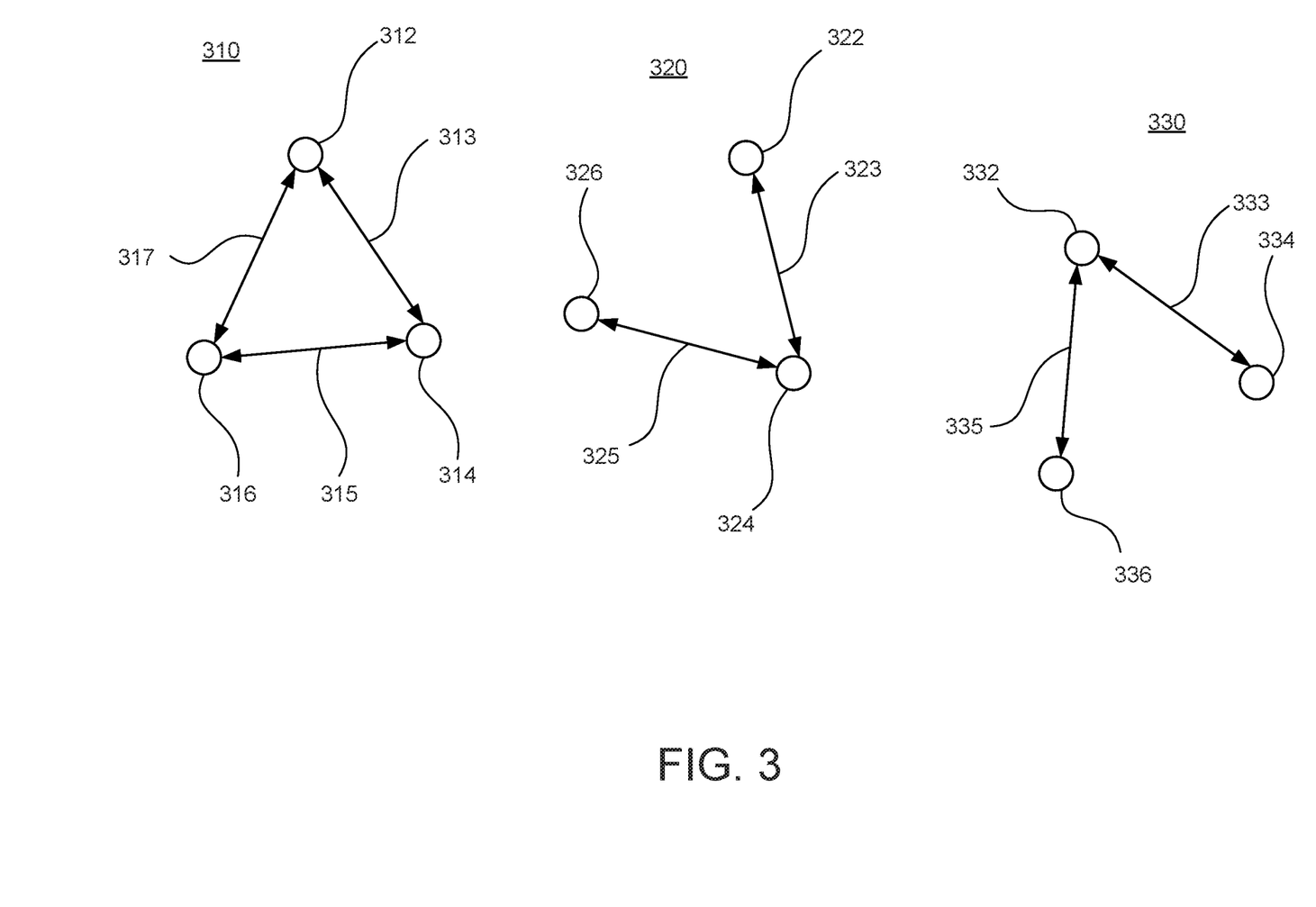
FIG. 3 illustrates several entity graphs showing node relationships, in accordance with various embodiments.

Referring to FIG. 3, several entity graphs showing node relationships are illustrated according to various embodiments. Customer to customer relationships are illustrated in the customer to customer entity graph 310. The customer to customer entity graph 310 may comprise a first node 312, a second node 314, and a third node 316. The first node 312 may represent a first entity. The first entity may be a customer of a merchant. The system may include stored attributes of the first entity, including an address of the first entity, and a product relationship of the first entity with the merchant. For example, the product relationship may indicate that the first entity has a premium product with the merchant.

The second node 314 may represent a second entity. The second entity may also be a customer of the merchant. The stored attributes of the second entity may indicate that the second entity has an entry-level product or entry-level account with the merchant. The third node 316 may represent a third entity. The third entity may be a former customer of the merchant. The stored attributes of the third entity may indicate that the third entity formerly had a premium product with the merchant.

The stored attributes for the first entity, the second entity, and the third entity may indicate that all three entities have the same address. The matched address may be visually indicated by the edges between nodes. For example, a first edge 313 between the first node 312 and the second node 314 may indicate that the first entity and the second entity have the same address. Similarly, a second edge 315 between the second node 314 and the third node 316 may indicate that the second entity and the third entity have the same address, and a third edge 317 between the first node 312 and the third node 316 may indicate that the first entity and the third entity have the same address.

In various embodiments, the customer to customer entity graph 310 may be displayed on a screen of a computing device, such as client 222 in FIG. 2, which may be operated by an employee of the merchant. The employee may want to know about any relationships the first entity may have in the network, so the employee may enter or select information on the first entity. The system may display the customer to customer entity graph 310, and the employee may click on or otherwise select the displayed nodes and edges to view information about the displayed nodes and edges. Based on the displayed relationships, the employee may identify opportunities to upsell the second entity to purchase a premium product from the merchant, because other entities at the same address were willing to purchase premium products from the merchant. Similarly, the employee may identify opportunities to target the third entity to purchase a premium or entry-level product from the merchant, as other entities at the same address A simple business to business entity graph 320 illustrates relationships between businesses. The business to business entity graph 320 comprises a first node 322, a second node 324, and a third node 326. Each node may represent a business. The first node 322 may represent a first entity which manufactures hard drives. The second node 324 may represent a second entity which manufactures computers. The third node 326 may represent a third entity which manufactures display panels. A first edge 323 between the first node 322 and the second node 324 may represent a relationship between the first entity and the second entity. For example, the first edge 323 may indicate that the second entity purchases hard drives from the first entity. Similarly, a second edge 325 between the second node 324 and the third node 326 may indicate that the second entity purchases display panels from the third entity.

A user viewing the business to business entity graph 320 may evaluate the relationships in order to make decisions. For example, the user may be an employee of a business which lends funds to the second entity. Based on the business's knowledge of a stable financial health of the second entity, the user may decide that the business may lend funds to the first entity or the third entity, as the user may understand that the first entity and the third entity have a stable customer in the second entity.

A simple business to customer entity graph 330 illustrates relationships between businesses and customers. The business to customer entity graph 330 may include a first node 332, a second node 334, and a third node 336. The first node 332 may represent a first entity, and the first entity may be an individual. The stored attributes for the first entity may indicate that the individual is in default on a transaction account. The second node 334 may represent a second entity, and the second entity may be a business. A first edge 333 between the first node 332 and the second node 334 may indicate that the first entity and the second entity share a name, address, and taxID number. Due to the default of the first entity, an employee viewing the business to customer entity graph 330 may decide to decline or reduce credit to the second entity. Similarly, a second edge 335 between the first node 332 and the third node 336 may indicate that the first entity and a third entity represented by the third node 336 share an account address, wherein the third entity is an individual. The user viewing the business to customer entity graph 330 may decide to reduce or terminate credit to the third entity based on the default of the first entity. In various embodiments, the edges may be displayed in different colors, patterns, or thicknesses to illustrated different types of relationships or different strengths of relationships between nodes.

Figure 4:
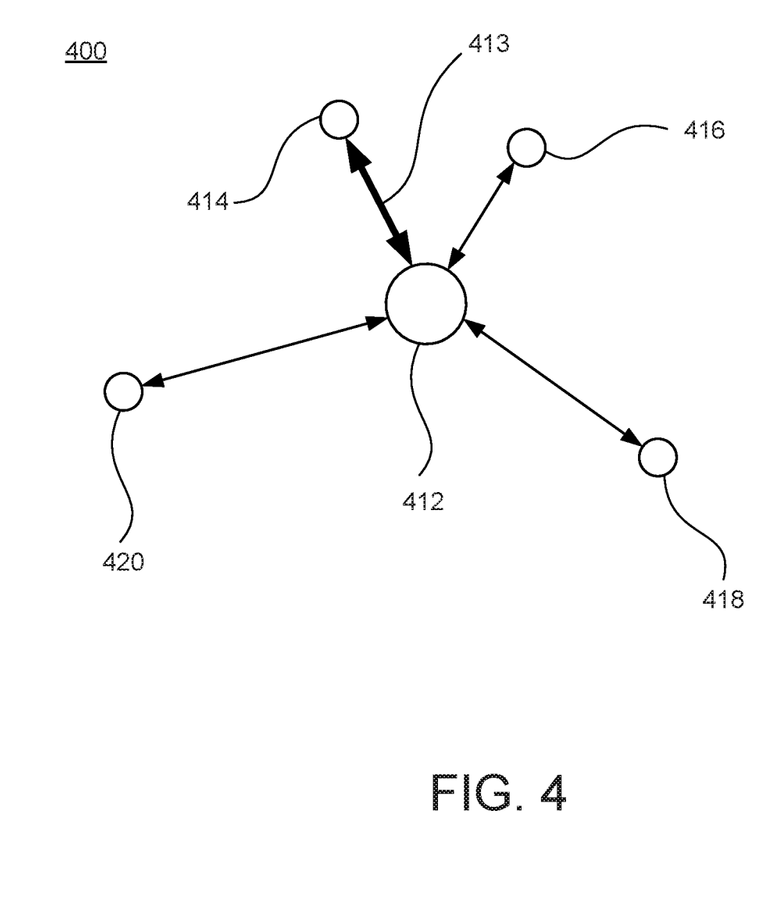
FIG. 4 illustrates a behavioral linkage entity graph, in accordance with various embodiments.

Referring to FIG. 4, a behavioral linkage entity graph 400 is illustrated according to various embodiments. The behavioral linkage entity graph 400 may comprise a first node 412, a second node 414, a third node 416, a fourth node 418, and a fifth node 420. A user may have selected the first node 412, thus the first node 412 may be displayed as a larger node than the second node 414, the third node 416, the fourth node 418, and the fifth node 420. Edges between the first node 412 and the other nodes may represent relationships or similarities between the first node 412 and the other nodes. For example, a user may select a first edge 413 between the first node 412 and the second node 414. Relationship data for the first node 412 and the second node 414 may be displayed. Additionally, a degree of offer similarity between the first node 412 and the second node 414 may be displayed. For example, the degree of offer similarity may be 75%, indicating that the entity represented by the second node 414 may respond to an offer the same way as the entity represented by the first node 412 75% of the time. The system may include recommendation, fraud, and event-based systems which may leverage behavioral linkage data as an input to make systematic decisions. Thus, the system or a user may decide not to present an offer to the entity represented by the second node 414 if the entity represented by the first node previously responded negatively to the offer. Similarly, the user may decide to present the offer to the entity represented by the second node 414 if the entity represented by the first node 412 previously responded positively to the offer, and vice versa. In various embodiments, the degree of similarity may be visually reflected by the edge. For example, the first edge 413 is displayed as thicker than the other edges, which may indicated that the first edge 413 has a relatively higher degree of similarity.

In various embodiments, the user may select a different node, such as the second node 414, and the computer system may display the second node 414 as the selected node, and the computer system may display the different nodes which have relationships with the second node 414.

Figure 5:
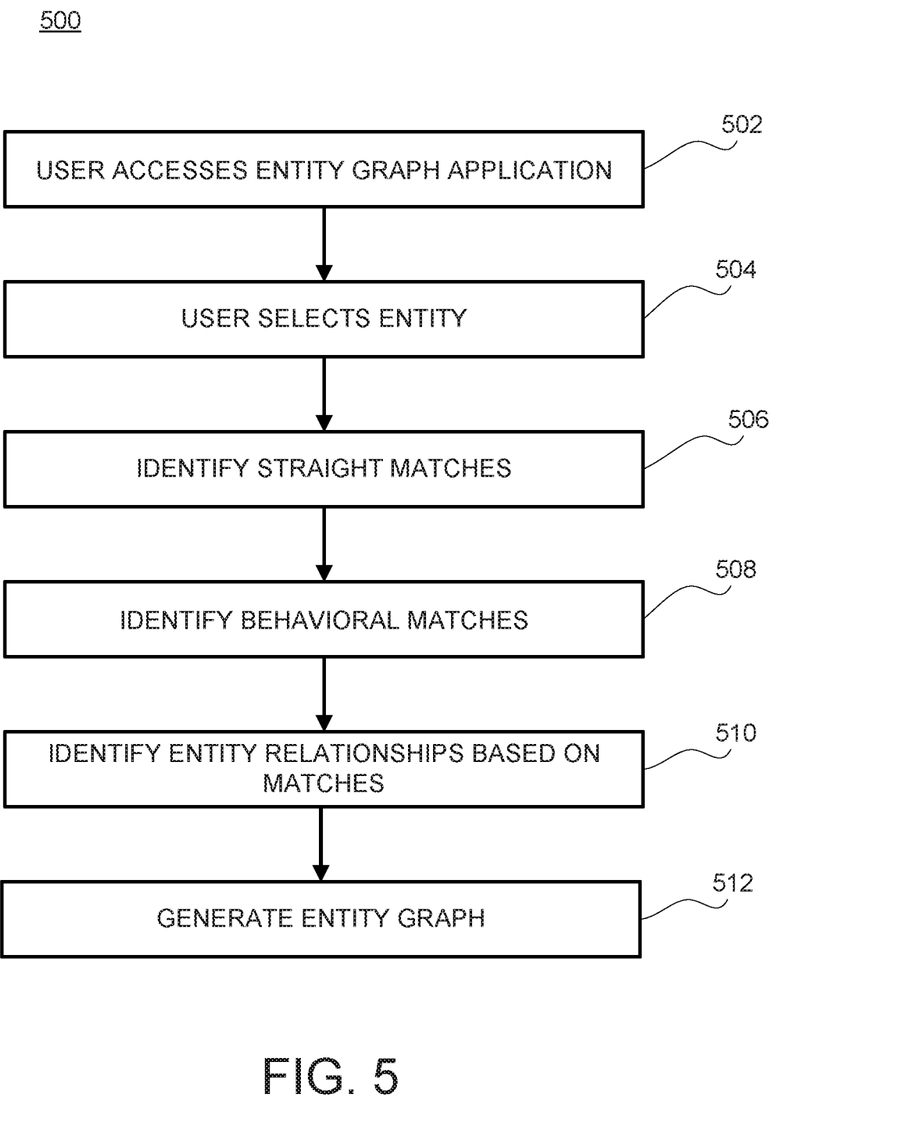
FIG. 5 illustrates a flowchart of a process for identifying and displaying node linkages in a graphical user interface, in accordance with various embodiments.

Referring to FIG. 5, a flowchart 500 of a process for identifying and displaying node linkages in a graphical user interface is illustrated, according to various embodiments. A user may access an entity graph application (step 502). The user may access the entity graph application on a computing device, such as a computer or smartphone. In various embodiments, the user may provide identifying information, such as a username and password, and a node linking system may verify the identifying information. In various embodiments, the user may be an employee of a business. For example, the business may be a transaction account issuer, and the employee may handle fraud analysis or marketing.

The user may select an entity (step 504). In various embodiments, the user may select an entity by clicking on or entering identifying information, such as name, customer ID number, social security number, address, email address, etc., or by selecting on a node or selecting the entity from a list. The node linking system may identify similar attributes between those of the selected entity and other entities. The node linking system may identify both straight matches (step 506) and behavioral matches (step 508). The straight matches may compare data values such as name, address, phone, email, cookies, IP address, social security number, driver license, GUID, ICLIC_ID, DUNS, tax identification number, etc. In various embodiments, the straight matches may be exact matches, in which the attribute value for one entity has an identical value as the attribute value for a different entity.

In various embodiments, the matches may be inexact matches, in which the attribute value for one entity has a similar, but non-identical value, as the attribute value for a different entity. For example, a first entity may have a first name attribute value of "JOHNSON," and a second entity may have a first name attribute value of "JOHNSTON." As another example, a first entity may have an address street number attribute value of "5522," and a second entity may have an address street number attribute value of "522." In various embodiments, the node linking system may calculate a percentage likelihood that two slightly different attribute values represent the same actual value. For example, based on other known relationships within the node linking system, the node linking system may determine that 90% of the time, the first name attribute value of "JOHNSON" and "JOHNSTON" represent the same actual value. Similarly, the node linking system may determine that the address street number attribute value of "5522" and "522" represent the same or different value based on application of the rule. In various embodiments, if the percentage likelihood is above 90%, the system may consider the two values to be a match. The system may cross-verify matches based on customer data, as well as acquired data, such as postal service data, in order to enrich or cleanse the data.

The behavioral match may compare attributes such as offer similarity, channel similarity, content similarity, and transaction similarity. The offer similarity may indicate a likelihood that a first entity may respond in the same way as a second entity in response to an offer. For example, in response to receiving an unsolicited gift card to a restaurant, the first entity may be 90% likely to respond in the same manner as the second entity (e.g., by using the gift card). In various embodiments, the node linking system may calculate an offer similarity score, such as from 0-99, between two entities. A higher score may indicate a greater likelihood that two entities will respond similarly to an offer. In various embodiments, the similarities may be categorized into degrees, such as a high degree of similarity from 95%-100%, a medium degree of similarity from 85% to 95%, a low degree of similarity from 65%-85%, and no similarity from 0%-65%. In various embodiments, the similarity may be scored using Locality Sensitive Hashing (LSH) with Euclidean distance (d) measured to calculate the similarity. The similarity score may be defined as $1/(1+d)$, with lower distances between any two feature vectors representing higher similarity scores.

The channel similarity may describe the similarity between channels used by two different entities. For example, a first entity may make 90% of their transactions using a digital wallet. However, a second entity may only make purchases using a plastic credit card in person. Thus, the first entity and the second entity may have a low channel similarity. In various embodiments, the node linking system may calculate a channel similarity score, such as from 0-99, between two entities. A higher score may indicate that the two entities utilize the same channels frequently.

The content similarity may describe the similarity between content consumed by two different entities. For example, a first entity and a second entity may both purchase computer hard drives at least once per week. In various embodiments, the node linking system may calculate a content similarity score, such as from 0-99, between two entities. A higher score may indicate that the two entities consume similar content frequently.

The transaction similarity may describe the similarity between transaction attributes by two different entities. The transaction attributes may include date, time, amount, merchant, items, etc. For example, if two different entities each had a transaction for the same amount at the same time at the same restaurant, it may indicate that the two different entities were dining together and split the bill. In various embodiments, the node linking system may calculate a transaction similarity score, such as from 0-99, between two entities. A higher score may indicate that the two entities conduct similar transactions.

The node linking system may identify entity relationships based on the straight matching and the behavioral matching (step 510). The node linking system may determine that two entities have a customer to customer relationship, a business to business relationship, and/or a business to customer relationship. In various embodiments, the relationship may be identified based on the similarity scores. For example, the node linking system may determine that any entity with an average similarity score of over 65 with the selected entity may have a relationship with the selected entity. In various embodiments, the user may modify the threshold similarity score in order to detect a larger or smaller number of relationships with the selected entity.

The node linking system may generate an entity graph for the selected entity (step 512). The node linking system may transmit data for the entity graph to the user's computer system, and the user's computer system may display the entity graph on a graphical user interface. The entity graph may display the selected entity as a central node, and the entities with identified relationships as additional nodes. The edges between the nodes may represent the relationships. The user may select an edge to view information about the relationships between nodes. The user may select a node on the entity graph, and the node linking system may provide information about the entity. In various embodiments, the node linking system may hash or encrypt any personally identifiable information about the entity. Thus, the node linking system may allow the user to view the relationships between entities without exposing sensitive information.

In various embodiments, the user may select a node in the entity graph in order to generate an entity graph for the newly selected node. For example, the user may be viewing an entity graph for a first node, and in response to the user selecting a second node in the entity graph, the node linking system may generate a new entity graph for the second node. Thus, the graphical user interface allows the user to quickly and easily view entity relationships and switch between selected entities.

The node linking system provides specific, structured graphical user interfaces with the described functionalities, which allow the user to easily view the relationships between entities. Additionally, in various embodiments, the entity graphs may be updated dynamically, such that as new data becomes available to the node linking system, such as an entity initiating a transaction, the entity graphs may be updated in real time, or near real time.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The disclosure and claims do not describe only a particular outcome of generating an entity graph, but the disclosure and claims include specific rules for implementing the outcome of generating an entity graph and that render information into a specific format that is then used and applied to create the desired results of generating an entity graph, as set forth in *McRO, Inc.* v. *Bandai Namco Games America Inc.* (Fed. Cir. case number 15-1080, Sep. 13, 2016). In other words, the outcome of generating an entity graph can be performed by many different types of rules and combinations of rules, and this disclosure includes various embodiments with specific rules. While the absence of complete preemption may not guarantee that a claim is eligible, the disclosure does not sufficiently preempt the field of generating an entity graph at all. The disclosure acts to narrow, confine, and otherwise tie down the disclosure so as not to cover the general abstract idea of just generating an entity graph. Significantly, other systems and methods exist for generating an entity graph, so it would be inappropriate to assert that the claimed invention preempts the field or monopolizes the basic tools of generating an entity graph. In other words, the disclosure will not prevent others from generating an entity graph, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944, 849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Entity graphs may be constructed in a variety of formats, and those specifically described herein are merely some examples. For more information on entity graphs, see U.S. Pat. No. 9,087,088 titled SYSTEMS AND METHODS FOR DYNAMIC CONSTRUCTION OF ENTITY GRAPHS, the contents of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook, Twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A client, or web client, includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk.

All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a computer-based system, a selection of a first entity;
calculating, by the computer-based system, a similarity between first entity attributes for the first entity and second entity attributes for a second entity;
identifying, by the computer-based system, a relationship between the first entity and the second entity based on the calculated similarity between the first entity attributes and the second entity attributes; and
generating, by the computer-based system, an entity graph for the first entity,
wherein the entity graph displays a first node representing the first entity, a second node representing the second entity, and an edge connecting the first node and the second node, wherein the edge has a plurality of features associated with the relationship between the first entity and the second entity, the plurality of features of the edge including a first edge feature representing a type of the relationship between the first entity and the second entity and a second edge feature representing a strength of the relationship between the first entity and the second entity based on the calculated similarity between the first entity attributes and the second entity attributes.

2. The method of claim 1, further comprising:
receiving, by the computer-based system, a plurality of nodes and attributes associated with the plurality of nodes; and
transmitting, by the computer-based system, a list of all nodes in the plurality of nodes sharing a common attribute.

3. The method of claim 1, further comprising:
receiving, by the computer-based system, a list of all nodes sharing a common attribute; and
transmitting, by the computer-based system, the entity graph, wherein the entity graph comprises the nodes sharing the common attribute and edges between the nodes sharing the common attribute.

4. The method of claim 1, further comprising:
receiving, by the computer-based system, a selected entity; and
generating, by the computer-based system, an entity graph for the selected entity.

5. The method of claim 1, wherein the type of the relationship comprises a customer to customer relationship, a business to business relationship, or a business to customer relationship, wherein the first edge feature indicates an existence of the customer to customer relationship, the business to business relationship, or the business to customer relationship.

6. The method of claim 5, further comprising calculating, by the computer-based system, a confidence level of the relationship.

7. The method of claim 6, wherein the plurality of features of the edge further represent confidence level of the relationship.

8. The method of claim 1, wherein the similarity comprises a behavioral match.

9. The method of claim 1, wherein the plurality of features of the edge comprises at least two of a color of the edge, a thickness of the edge, or a pattern of the edge.

10. A system comprising:
a processor,
a tangible, non-transitory memory configured to communicate with the processor,
the tangible, non-transitory memory having instructions stored thereon that, in response to execution by the processor, cause the processor to perform operations comprising:
receiving a selection of a first entity;
calculating, a similarity between first entity attributes for the first entity and second entity attributes for a second entity;
identifying a relationship between the first entity and the second entity based on the calculated similarity between the first entity attributes and the second entity attributes; and
generating an entity graph for the first entity,
wherein the entity graph displays a first node representing the first entity, a second node representing the second entity, and an edge connecting the first node and the second node, wherein the edge has a plurality of features associated with the relationship between the first entity and the second entity, the plurality of features of the edge including a first edge feature representing a type of the relationship between the first entity and the second entity and a second edge feature representing a strength of the relationship between the first entity and the second entity based on the calculated similarity between the first entity attributes and the second entity attributes.

11. The system of claim 10, the operations further comprising:
receiving a plurality of nodes and attributes associated with the plurality of nodes; and
transmitting a list of all nodes in the plurality of nodes sharing a common attribute.

12. The system of claim 10, the operations further comprising:
receiving a list of all nodes sharing a common attribute; and
transmitting the entity graph, wherein the entity graph comprises the nodes sharing the common attribute and edges between the nodes sharing the common attribute.

13. The system of claim 10, the operations further comprising:
receiving a selected entity; and
generating an entity graph for the selected entity.

14. The system of claim 10, wherein the type of the relationship comprises a customer to customer relationship, a business to business relationship, or a business to customer relationship.

15. The system of claim 14, the operations further comprising calculating a confidence level of the relationship.

16. The system of claim 8, wherein the plurality of features of the edge further represent a confidence level of the relationship.

17. The system of claim 10, wherein the plurality of features of the edge comprises at least two of a color of the edge, a thickness of the edge, or a pattern of the edge.

18. An article of manufacture including a non-transitory, tangible computer readable storage medium having instructions stored thereon that, in response to execution by a computer-based system, cause the computer-based system to perform operations comprising:

receiving a selection of a first entity;

calculating a similarity between first entity attributes for the first entity and second entity attributes for a second entity;

identifying a relationship between the first entity and the second entity based on the calculated similarity between the first entity attributes and the second entity attributes; and generating an entity graph for the first entity, wherein the entity graph displays a first node representing the first entity, a second node representing the second entity, and an edge connecting the first node and the second node, wherein the edge has a plurality of features associated with the relationship between the first entity and the second entity, the plurality of features of the edge including a first edge feature representing a type of the relationship between the first entity and the second entity and a second edge feature representing a strength of the relationship between the first entity and the second entity based on the calculated similarity between the first entity attributes and the second entity attributes.

19. The article of manufacture of claim 18 wherein the type of the relationship comprises a customer to customer relationship, a business to business relationship, or a business to customer relationship.

20. The article of manufacture of claim 18, wherein the plurality of features of the edge comprises at least two of a color of the edge, a thickness of the edge, or a pattern of the edge.

* * * * *